J. W. CALHOUN.
WATER METER SETTING OR CONNECTION.
APPLICATION FILED MAY 20, 1914.

1,142,667.

Patented June 8, 1915.

Witnesses:—
Frederick W. Miran
C. C. Hines.

Inventor
John W. Calhoun,
By Victor J. Evans
Attorney

UNITED STATES PATENT OFFICE.

JOHN W. CALHOUN, OF HUNTINGTON, WEST VIRGINIA.

WATER-METER SETTING OR CONNECTION.

1,142,667. Specification of Letters Patent. Patented June 8, 1915.

Application filed May 20, 1914. Serial No. 839,847.

*To all whom it may concern:*

Be it known that I, JOHN W. CALHOUN, a citizen of the United States, residing at Huntington, in the county of Cabell and State of West Virginia, have invented new and useful Improvements in Water-Meter Settings or Connections, of which the following is a specification.

My invention relates to a water meter setting or connection, the object of the invention being to provide a construction of connection or setting whereby the meter may be easily and conveniently coupled to and uncoupled from the branches of the water service pipe, and whereby a strong, durable and leak-proof connection may be secured.

A further object of the invention is to provide a meter setting which enables the use of small meter boxes and the arrangement of the meter at a point closer to the surface, as well as a construction which obviates the necessity of employing a wrench or like tool in applying and removing the meter.

The invention consists of the features of construction, combination and arrangement of parts herein fully described and claimed, reference being had to the accompanying drawings in which:—

Figure 1:
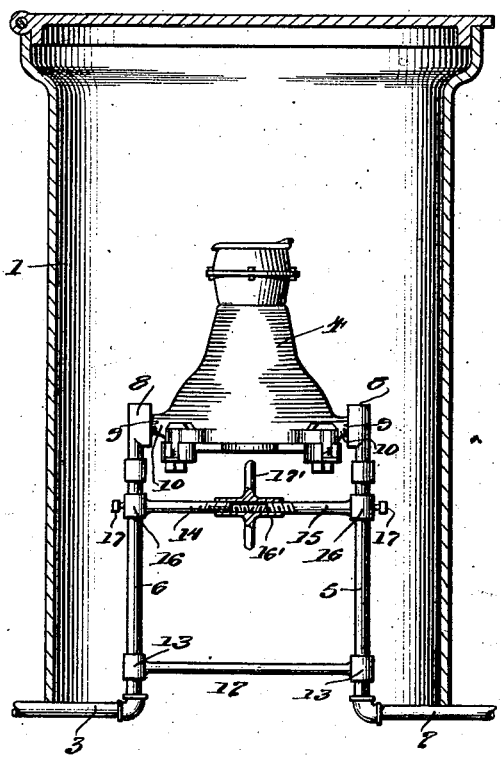
Figure 3:
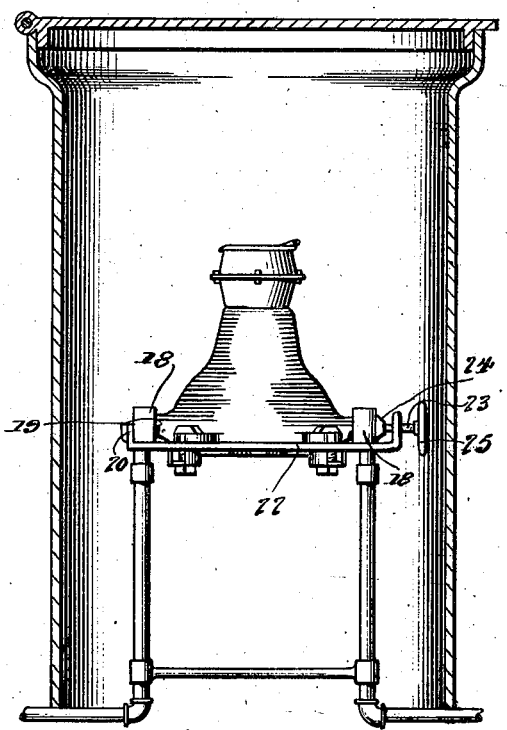
Figure 2:
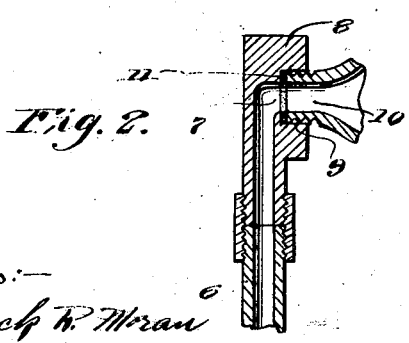
Figure 4:
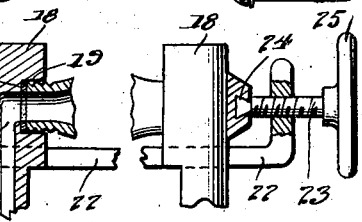

Figure 1 is a sectional elevation showing one form of my invention as employed in use. Fig. 2 is a detail section of one of the branch pipes and unions on an enlarged scale. Fig. 3 is a view similar to Fig. 1 showing a modified form of the invention. Fig. 4 is a partly sectional elevation of the supporting and sealing connections shown in Fig. 3.

Referring to Figs. 1 and 2, 1 designates a meter box and 2 and 3 the sections of a water service pipe, between which the meter 4 is interposed. In accordance with my invention these pipe sections are provided with branches 5 and 6 which extend vertically therefrom in substantially parallel relation to a point well up within the meter box 1.

The pipe sections 5 and 6 are closed at their upper ends and are provided on their inner faces, adjacent such ends with lateral ports 7. Suitably secured to the upper ends of the pipe branches are unions 8 having inwardly extending portions formed with sockets 9, to receive the spuds or ends 10 of the meter casing, through which the inlet and exit ports extend. The spuds 10 are adapted to fit snugly within said sockets, and gaskets 11, of rubber or other suitable material, are provided to form a tight joint.

The lower ends of the pipe branches are connected and held in spaced relation by a stay 12 having eyes 13 which embrace said branches, said stay acting to reinforce the branches and prevent the same from having outward relative or spreading movement beyond a predetermined extent. The upper ends of the pipe branches are adapted to be spread to the requisite extent to admit and release the meter spuds 10, and permit of their application to and removal from the sockets of the unions, so that the meter may be applied and removed in a ready and convenient manner and without the necessity of employing a wrench or threaded coupling connections. Extending between the pipe sections between the stay 12 and the unions are right and left hand threaded rod sections 14 and 15 having eyes 16 provided with set screws 17 to engage the pipe sections, whereby they are secured against relative displacement. A right and left hand threaded sleeve 16' engages the threaded ends of the rod sections and is provided with a hand wheel 17', whereby said rod sections may be moved inwardly and outwardly with relation to each other, so as to spread the pipe sections apart or draw them together. The rod sections form a supplementary stay and the sleeve and its wheel a turn buckle of convenient construction whereby the rod sections may be adjusted to spread the pipe sections a proper distance to receive or release the meter, and drawn together so as to clamp the spuds of the meter snugly within the sockets of the unions and in sealing engagement with the gaskets 11.

The construction described allows the meter to be mounted at an elevation above the level of the service pipe so that it may be arranged within an ordinary sewer tile, forming the box 1, allowing the meter to be conveniently inspected and applied and removed whenever occasion requires, in a simple, convenient and labor saving manner.

In the form of my invention illustrated in Figs. 3 and 4 the unions 18 are provided with sockets 19 to receive the meter spuds 10, which sockets communicate with passages 20 in said unions threaded at their lower ends to receive the upper ends of the pipe sections 2 and 3, gaskets 21 being employed in the sockets to effect a tight sealing connection.

Fixed to one of the unions and slidably connected with the other union is a frame 22, one end of which has a threaded opening receiving an adjusting screw 23, swiveled in the adjacent union, as indicated at 24, and provided with a hand wheel 25. The frame and screw normally connect and hold the unions in proper relative positions, and by adjusting the screw shaft it is evident that one of the unions may be moved with relation to the other to vary the space between the unions, so that the meter may be applied and removed, advantage being taken in this connection, as in the construction previously described, of the capability of the branch pipes to bend or flex for the spreading action.

From the foregoing description, taken in connection with the drawings, the construction, mode of operation and advantages of my improved water meter setting connection will be readily understood, without a further extended description and it will be evident that the construction described secures the desired purposes and advantages in a reliable and effective manner.

I claim:—

1. In combination, a meter box, a service pipe having branches extending upwardly into the meter box, a meter, interfitting connections between the pipe branches and meter for coupling the meter to said branches, and means connecting said pipe branches for relatively adjusting said pipe branches inwardly and outwardly with relation to each other for coupling engagement with and disengagement from the meter.

2. In combination, a meter box, a pipe having branches extending upwardly into the meter box, a meter having inlet and exit portions, connections upon the pipe branches to engage said inlet and exit portions of the meter, means connecting said pipe branches for drawing the pipe branches together to bring said connections into coupling and sealing engagement and for spreading the branches to disengage said connections, and means for staying and limiting the spreading motion of the pipe branches.

3. In combination, a meter box, a pipe having branches extending upwardly into the meter box in substantially parallel relation, a meter having inlet and exit portions, coupling devices upon the pipe branches for coupling and sealing engagement with said inlet and exit portions of the meter, a connection between the pipe branches operable to draw the same together to bring said coupling connections into engagement to effect a spreading action of the pipe branches to disengage said connections and release the meter, and a second connection between the pipe branches to limit their spreading motion.

4. In combination, a meter box, a pipe having branches extending upwardly into the meter box in substantially parallel relation, a meter having inlet and exit spuds, unions upon the pipe branches provided with sockets to receive said spuds, said sockets having gaskets therein to effect an automatic sealing connection when the unions are drawn into engagement with the spuds, and means connecting the respective pipe branches and unions with each other, and whereby said pipe branches and unions may be relatively adjusted toward and from each other.

In testimony whereof I affix my signature in presence of two witnesses.

JOHN W. CALHOUN.

Witnesses:
F. CHILDS,
FRANK ROLF.